June 28, 1966 H. J. HEYMANN 3,258,696

MULTIPLE BISTABLE ELEMENT SHIFT REGISTER

Filed Sept. 3, 1963 3 Sheets-Sheet 1

INVENTOR
HANS HEYMANN

BY: Toulmin & Toulmin
ATTORNEYS

June 28, 1966 H. J. HEYMANN 3,258,696

MULTIPLE BISTABLE ELEMENT SHIFT REGISTER

Filed Sept. 3, 1963 3 Sheets-Sheet 2

INVENTOR
HANS HEYMANN
BY Toulmin & Toulmin
ATTORNEYS

MULTIPLE BISTABLE ELEMENT SHIFT REGISTER

Filed Sept. 3, 1963 3 Sheets-Sheet 3

INVENTOR
HANS HEYMANN
BY Toulmin & Toulmin
ATTORNEYS

United States Patent Office 3,258,696

Patented June 28, 1966

3,258,696

MULTIPLE BISTABLE ELEMENT SHIFT REGISTER

Hans J. Heymann, Wilhelmshaven, Germany, assignor to Olympia Werke A.G., Wilhelmshaven, Germany Filed Sept. 3, 1963, Ser. No. 306,262
Claims priority, application Germany, Oct. 1, 1962, O 8,998
3 Claims. (Cl. 328—37)

The present invention relates to improvements in shift registers composed of interconnected bistable switching elements.

Shift registers of this type commonly have their switching elements connected to a source of shifting or clock pulses; one switching element is usually in the "on" state while the other elements are in the "off" state. In synchronism with the appearance of the shifting or clock pulses, the "on" state is shifted from one element to the next one by successively turning on one element after the other. These elements may be interconnected so as to form an endless chain and the "on" state thus runs cyclically through the register. It is apparent that such arrangement can suitably be use as a pulse frequency divider with the division being equal to the number of stages employed.

The known networks of the above-mentioned type have several drawbacks. Usually, one needs a resetting device to return the switching elements to the zero or "off" state. This is particularly necessary because the various elements are quite capable of assuming arbitrary switching states whenever the register has been turned on as a whole, i.e., connected to the power supply source. Such arbitrary "on" states will also travel as shift register pulses and therefore a master resetting device is usually required to erase such disturbances before proper operation can commence. However, disturbances appearing while the register is running cannot be reset without first halting the shifting of the register. All of these disturbances continue to run through the register until the register is stopped and, until the register is stopped, the erroneous divider frequency pulses appear continuously. Since such disturbances might be cumulative, there might soon arise a number of disturbance pulses producing an erratic pulse pattern having a large number of widely differing superimposed frequencies.

It is an object of the present invention to avoid the aforementioned difficulties without increasing the number of circuit elements employed.

According to one form of the present invention, it is suggested to provide a plurality of bistable switching elements which are interconnected together and which are each connected to a source of shift register pulses in such a manner that each element can be switched only if its preceding element is in the opposite switching state at the time the pulse for switching appears.

In the series circuit network of switching elements defining the shift register there is thus provided a first element which is switched on by a pulse derived from an "and" gate having as many gating terminals as there are switching elements, connections being made in such a manner that any gating terminal is at the "gating open" state when its associated bistable switching element is in its "off" state. The main input terminal of this "and" gate is connected to the shift register pulse delivery line.

This arrangement ensures that a cycle can be started only when all switching elements have returned to the "off" or zero state. But as soon as this condition exists, a new cycle is started. Thus, there is no arbitrary interruption at the end of any shift register cycle because the end of each cycle is characterized by the fact that the last switching element has reverted to its "off" state. Immediately thereafter, the first element is reset for switching, and switching will occur with the next shift register pulse, thus starting a new cycle.

Any disturbance appearing initially or during regular operation will indeed be shifted to the end of the register chain of switching elements, whereafter the register will be empty. This is true, regardless of how many disturbances there are, because the very first element will not be energized for a new cycle until all disturbances have been eliminated. It is thus impossible for proper shifting pulses as well as for disturbances to pass cyclically through the register until a complete interruption of operation has been somehow (for example, by a human operator) initiated.

The principle involved here is one of true cyclic operation, but the register is not a ring-type network. Cyclic operation is not attained by interconnecting respective first and last elements in the manner in which any other two succeding elements are interconnected, but the first switching element responds to all of the elements and not merely to the last one. One can see that by virtue of these provisions, no resetting device at large is necessary.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
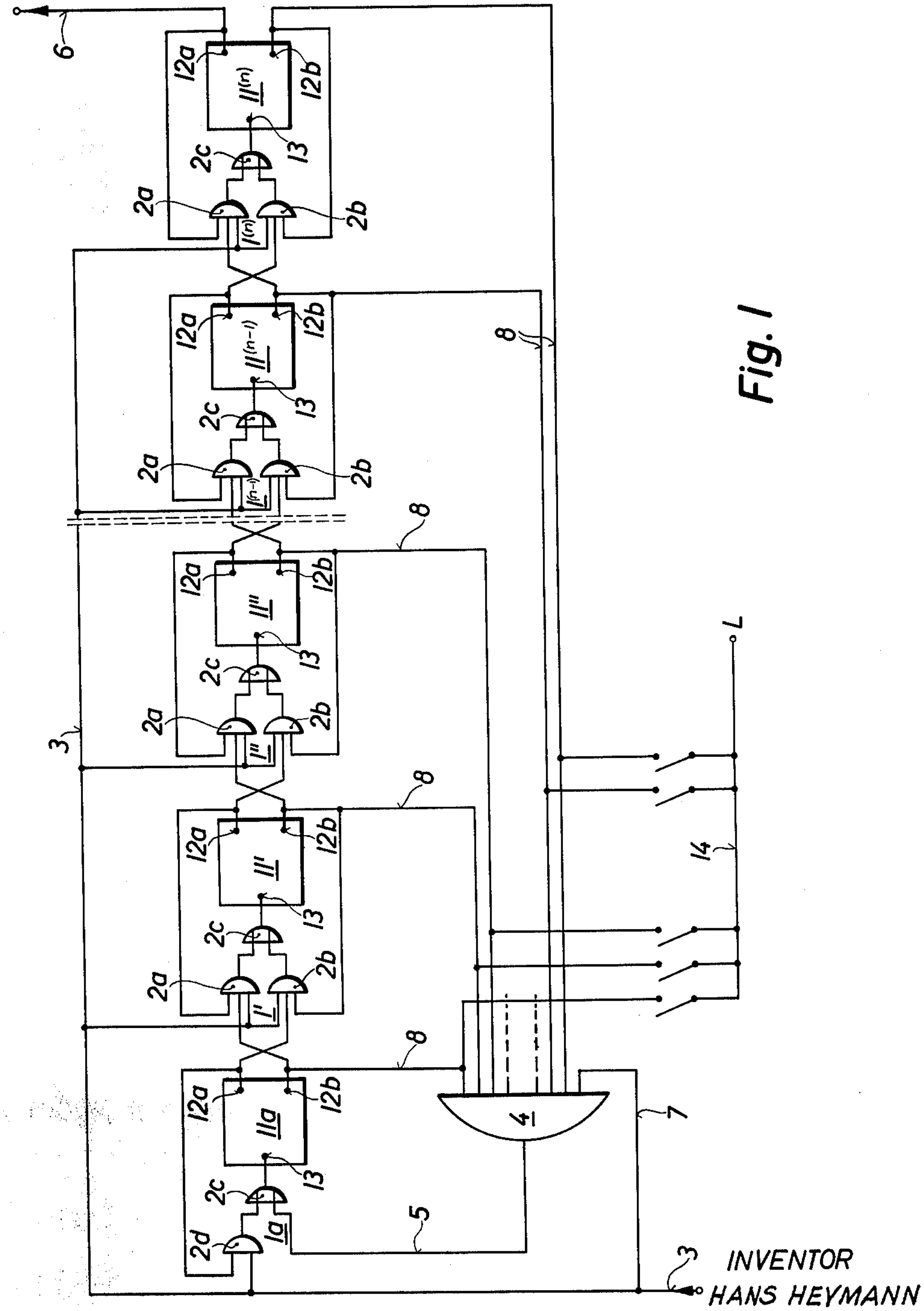
FIGURE 1 illustrates schematically a block diagram of a first preferred embodiment of the invention.

Proceeding now to the detailed description of the drawings, in FIG. 1 thereof there is shown a shift register comprised of a plurality of switching stages, altogether $n+1$, with $n$ being a suitably selected integer. There exists $n$-switching stages, denoted with reference numerals 1', 1'', . . ., $1^{(n-1)}$, $1^{(n)}$, respectively.

Each such switching stage includes a bistable switching element 11', 11'', . . ., $\mathbf{11^n}$, respectively. The bistable switching elements preferably are constituted by electronic flip-flops. Each switching element has one input terminal 13 and two output terminals 12*a* and 12*b*. The two possible states of the individual output terminals are to be designated with L and O, and the state of each flip-flop shall be characterized by denoting the L and O conditions of the output terminals (12*a*, 12*b*). It shall be assumed that a switching pulse L at input terminal 13 switches the flip-flop in any case from its previously existing state to the contrary one, i.e. from (O, L) to (L, O) or from (L, O) to (O, L).

For purposes of convenience a state $(12a, 12b)=(L, O)$ shall be considered to constitute the "on" state of the flip-flop, whereas $(12a, 12b)=(O, L)$ shall denote the corresponding "off" state. The principle of operation involved in the present invention is independent of the polarity of pulses employed. Thus, the L-state may be positive or negative with regard to the O-state. Flip-flops are usually wired so as to be completely symmetrical, and flip-flops can also be wired to respond to either negative or positive switching pulses. In the instant case, flip-flops with one inputs terminal are shown. Employment of those with two input terminals will be described below with reference to FIG. 2.

The input terminal 13 of any switching element is controlled through two logic "and" gates 2*a* and 2*b*, each having three input terminals. To produce output L it shall be assumed that all of the three input terminals of an "and" gate must have input signals L. Thus, the output L of an "and" gate 2*a* or 2*b* is determined by an input combination of LLL, whereas all other input combinations of L and O produce the ouput O at the output of such "and" gate.

The three inputs of each "and" gate 2*a* comprise the following connections: one input terminal connected to a line 3 delivering shift register pulses, for example, at the clock pulse rate frequency of the system to which this shift register pertains; a second input terminal connected to output terminal 12*a* of the flip-flop forming part of the same stage; and a third input terminal connected to output terminal 12*b* of the switching element of the preceding switching stage.

Correspondingly, the inputs of "and" gate 2*b* are furnished by (1) shift register pulse delivery line 3, (2) output terminal 12*b* of the switching element forming part of the same stage, and (3) ouput terminal 12*a* of the switching element of the preceding stage.

Any such "and" gate has thus two gating terminals respectively connected to two succeeding switching elements and a main input terminal (at line 3) to which are applied the shift register pulses.

The output terminals of "and" gates 2*a* and 2*b* are connected to respective inputs of an "or" gate 2*c*, thus preventing undesired interaction between "and" gates 2*a* and 2*b*. The output terminal of "or" gate 2*c* is connected to the input terminal 13 of the switching element of its associated switching stage.

It was stated above that each switching element is considered to be in "on" state when there is an output L at its output terminal 12*a* (on-output-terminal), whereas an output L at its output terminal 12*b* (off-output-terminal) denotes the corresponding "off" state. Based on this convention, it should be noted that because the "and" gates 2*a*, 2*b* each have one of their two gating terminals connected to one output (e.g., the "on" output) of the preceding switching element and another of their gating terminals connected to the opposite ouput (e.g., the "off" output) of the succeeding switching element, both "and" gates 2*a*, 2*b* are closed when these two adjacent switching elements are in the same switching state, thus preventing the shift register pulse from effecting switching of the next following stage. This is, in fact, the desired result because no switching is to occur in any stage which is already in the same switching state as its immediately preceding stage at the time of occurrence of a shift register pulse. In any other case, i.e., when one stage is in the "on" state and the following stage is in the "off" state, or vice versa, one of the two "and" gates 2*a*, 2*b* has signals applied to its two gating terminals which permit the passage of the next occuring shift register pulse. Thus, the next occurring shift register pulse can switch the flip-flop of the following stage, thereby establishing the state of the preceding stage had prior to the time of occurrence of the shift register pulse.

The first stage 1*a* of the entire shift register will be described more fully below, but it also contains a flip-flop 11*a* similar to those described above and its terminals have been designated correspondingly .

The entire network or chain of flip-flop stages operates in accordance with the principle that the switching element of any stage can only be switched (turned on or off) if the flip-flop or switching element of the preceding stage is in the opposite switching state from the switching element in the stage to be switched.

Consider, for example, the following situation:

| | | | |
|---|---|---|---|
| Stage | 1*a* | 1′ | 1″ |
| Flip-flop | 11a | 11′ | 11″ |
| (12*a*, 12*b*) | (O,L) | (L,O) | (O,L) |

Prior to the appearance of a shift register pulse in line 3, the following "and" gates are prepared (gated open) by virtue of L-states at their respective gating terminals: 2*a* of stage 1′; and 2*b* of stage 1″. At the same time, the gating terminals of "and" gate 2*b* of stage 1′ and of "and" gate 2*a* of stage 1″ are all at O state, thus being closed to the next shift register pulse appearing on line 3.

The shift register pulse now appearing finds "and" gates 2*a* of stage 1′ and 2*b* of stage 1″ open. By virtue of the definition given above, flip-flop 11′ of stage 1′ and flip-flop 1″ of stage 1′ are both switched to now assume the states (O, L) and (L, O) respectively.

After completion of such switching action, it appears that both flip-flops 11*a* and 11′ are at the (O, L) state, both thus having assumed similar states. Accordingly, the gating terminals of the two "and" gates 2*a* and 2*b* of stage 1′, being connected to the output terminals of the flip-flops of stages 1*a* and 1′, are at opposite states so that neither "and" gate can pass the next occuring shift register pulse. This situation will not change until stage 1*a* has been switched again as will be described below.

However, "and" gate 2*a* of stage 1″ is prepared to pass a shift register pulse, having both its gating input terminals connected to (12*a* of 1″ and 12*b* of 1′) in the L state, and the next shift register pulse indeed switches this stage.

It will readily be understood that the shift register pulse shifts the "on" state from stage to stage, which is the flip-flop state (L, O), whereas normally each flip-flop is at the "off" state (O, L).

Now, the first stage 1*a* and its control network and operation shall be described in greater detail.

There is provided a master "and" gate 4 having a total of $n+2$ input terminals. Each of $n+2$ of these input terminals is connected to a respective output terminal 12*b* of the flip-flops in the $n+1$ stages 1*a*, 1′, 1″, . . ., $1^{(n)}$ via lines 8. The last input terminal is connected to shift register pulse delivery line 3 via a line 7.

It will be apparent that for the opening of the "and" gate 4 (output L) it is required that all of the flip-flops 11*a*, 11′, . . ., $11^{n}$ in the (O, L) state. That is to say, "and" gate 4 is gated open only if all the switching elements are turned "off," or, in other words, if the register has been shifted through all stages and is now empty.

In FIG. 1, there is additionally shown a selector switching device 14 which individually connects any of the gating terminals of "and" gate 4 to a source simulating a gating signal L. This source may simply comprise a D.C. voltage source applying a potential to any gating terminal, which potential is equal to that appearing at any flip-flop output 12*b* when it is in its L state. The purpose thereof is to permit an output pulse to be produced by gate 4 on line 5 even of all stages have not reverted to their "off" state.

The output terminal of "and" gate 4 connects to one input terminal of "or" gate 2*c* in stage 1*a* via the line 5. Thus, upon arrival of a shift register pulse at a time when "and" gate 4 is gated open by all of the switching elements, flip-flop 11*a* of stage 1*a* will be switched from (O, L) to (L, O) and will thus be turned "on." This switching operation readies the "and" gate 2*b* of switching element 11′ in stage 1′, since now the stage preceding stage 1′ has assumed the opposite state which is a prerequisite for a shifting of the register.

Switching of the first stage 1*a* in the register from the "off" state (O, L) to the energized, or "on," state (L, O) is possible only when all of the succeeding stages are in the normal, or "off," state. Thus, if for one reason or another, disturbance pulses have appeared placing any stage into its energized, or "on," state (L, O), the shift register cannot start a new cycle. Complete emptying of the register is the general prerequisite imposed by the circuit of the present invention for the starting of a new shifting cycle.

In course of the operation, care has to be taken to ensure that, after the start of a new cycle, the stage 1*a*, i.e., its associated flip-flop, will reverse to its normal state. This is important since the last stage $1^n$ is coupled to the first stage 1*a* only in the same manner as the other stages are, namely through "and" gate 4. Thus, one can not consider the network to be analogous to a ring counter in all respects. Without the provision of resetting measures for stage 1*a*, only a pulse flank, or edge, would be shifted.

In stage 1*a* there is now provided a logic "and" gate 2*d* having is output terminal connected to input terminal 13 of the flip-flop 11*a* of stage 1*a*; "and" gate 2*d* has two input terminals, one being a gating terminal connected to output terminal 12*a* of the stage 1*a* and the other being connected to shift register pulse delivery line 3.

Accordingly, when switching stage 1*a* is in its "on" state (L, O), the next shift register pulse finds gate 2*d* open to switch flip-flop 11*a* back to its "off" state (O, L).

In order to refine the network, it might be advisable to consider the following: When the register has been shifted so that the stage $1^x$ is in its "on" state (L, O), stages $1^{x-1}$ and $1^{x+1}$ are in their "off" state (O, L); stage $1^{x+1}$ can shift into its (L, O) state only if stage $1^x$ has not already reversed to (O, L). Thus provisions may be made to prevent any stage from shifting from one state to the other before its following stage has had the opportunity to switch and to thereby assume the state the preceding stage previously had. This result can be attained by inserting delay elements, such as R–C elements at the output terminals of the switching stages.

In many cases the rise time of the output pulses of the switching stages is fast enough to render delay elements unnecessary. This is true especially when the shift register pulses are differentiated before switching, the switching stages utilizing the spike wave form of the shift pulses thus obtained. This kind of pulse wave form for a shift register is especially advantageous when using switching stages having one input terminal as shown and responding to positive pulses by assuming the "on" state and to negative pulses by assuming the "off" state, or vice versa. The well known "Schmitt"-trigger, if designed to have a sufficiently large hysteresis loop and if biased to rest within the limits of this hysteresis loop, is to be cited as an example of such bistable switching stages. The leading edge then, e.g., controls the "on" state and the trailing edge controls the "off" state in case of originally positive shift register pulses.

Figure 4:
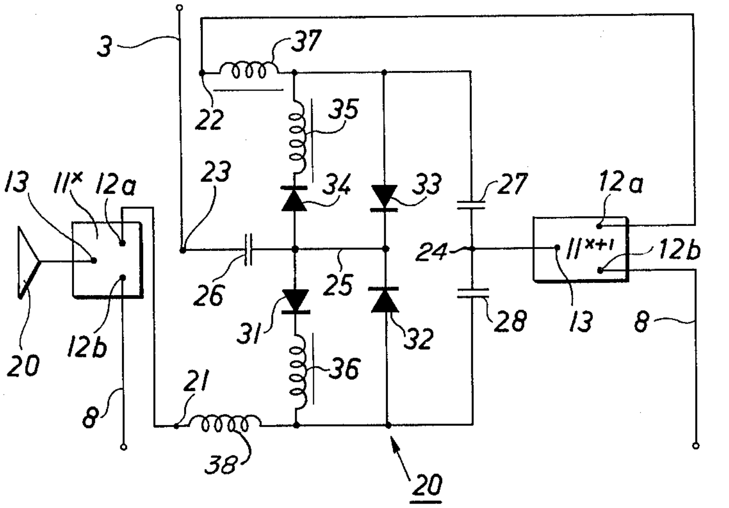
FIGURE 4 illustrates a modification of the embodiment shown in FIG. 1.

Turning briefly to FIG. 4, there is illustrated a modification of the network shown in FIG. 1. In particular, one coincidence network of the type denoted with reference numeral 20 is substituted for the networks 2*a*, 2*b* and 2*c* between any two succeeding stages $1^x$ and $1^{x+1}$ with $x$ being 1, 2, . . ., or $n-1$.

The network 20 has three iput terminals 21, 22 and 23 connected as follows: terminal 21 is connected to output terminal 12*a* of the preceding switching element, here denoted $11^x$; terminal 22 is connected to output terminal 12*a* of switching element $11^{x+1}$ of the stage to which network 20 belong; and terminal 23 is connected to shift pulse delivery line 3.

The network 20 itself is known and comprises four diodes 31, 32, 33, 34 having a common terminal 25 to which is connected terminal 23 via a differentiating capacitor 26. The polarity of the diode connections is shown in the drawing. Chokes 35, 36, 37 and 38 are connected to prevent A.C. pulse feedback into the switching elements through terminals 22 and 21, and to decouple the terminals 23 and 25 from the terminals 21 and 22 for A.C. pulse transmission. Chokes 35 and 36 in particular are intended to provide for sufficient load impedance. A capacitor 27 is connected between terminal 24 and the junction of chokes 35, 37 and of diode 33, while a capacitor 28 is connected between terminal 24 and the junction of chokes 36, 38 and of diode 32.

Any clock pulse (L) of short duration, but of a single polarity, applied to terminal 23 appears at terminal 25 as an A.C. wave having two half cycles of opposite polarity. In case the potentials at terminals 21 and 22 are equal, no change in potential appears at terminal 24. In case there is a potenital difference of either polarity, which will act as a bias voltage, between terminals 21 and 22, one or the other half cycle produced at terminal 25 by the clock pulse passes as a trigger pulse to terminal 13. That one of the two half cycles which passes depends on the polarity of the bias voltage. A potential difference between terminals 21 and 22 will be present when elements $11^x$ and $11^{x+1}$ are in opposite states, i.e., ($11^x$, $11^{x+1}$)=(on, off) or (off, on). When they are both on or both off, no potential difference exists between terminals 21 and 22. Network 20 is thus gated open for a shift pulse whenever elements $11^x$ and $11^{x+1}$ are in respective opposite states, and network 20 is closed when they are in similar states.

In case the situation prior to a shift pulse is ($11^x$, $11^{x+1}$)=(on, off), then the shift pulse acts to turn flip-flop $11^{x+1}$ on. The polarity should be selected so that this is done by the first one of the two half cycles at terminal 25 while, as a consequence stage $11^x$ will be turned off, through its controlling network 20, by the corresponding second half wave in that network. This relation ensures that flip-flop $11^{x+1}$ will be turned on slightly before flip-flop $11^x$ is turned off.

Figure 2:
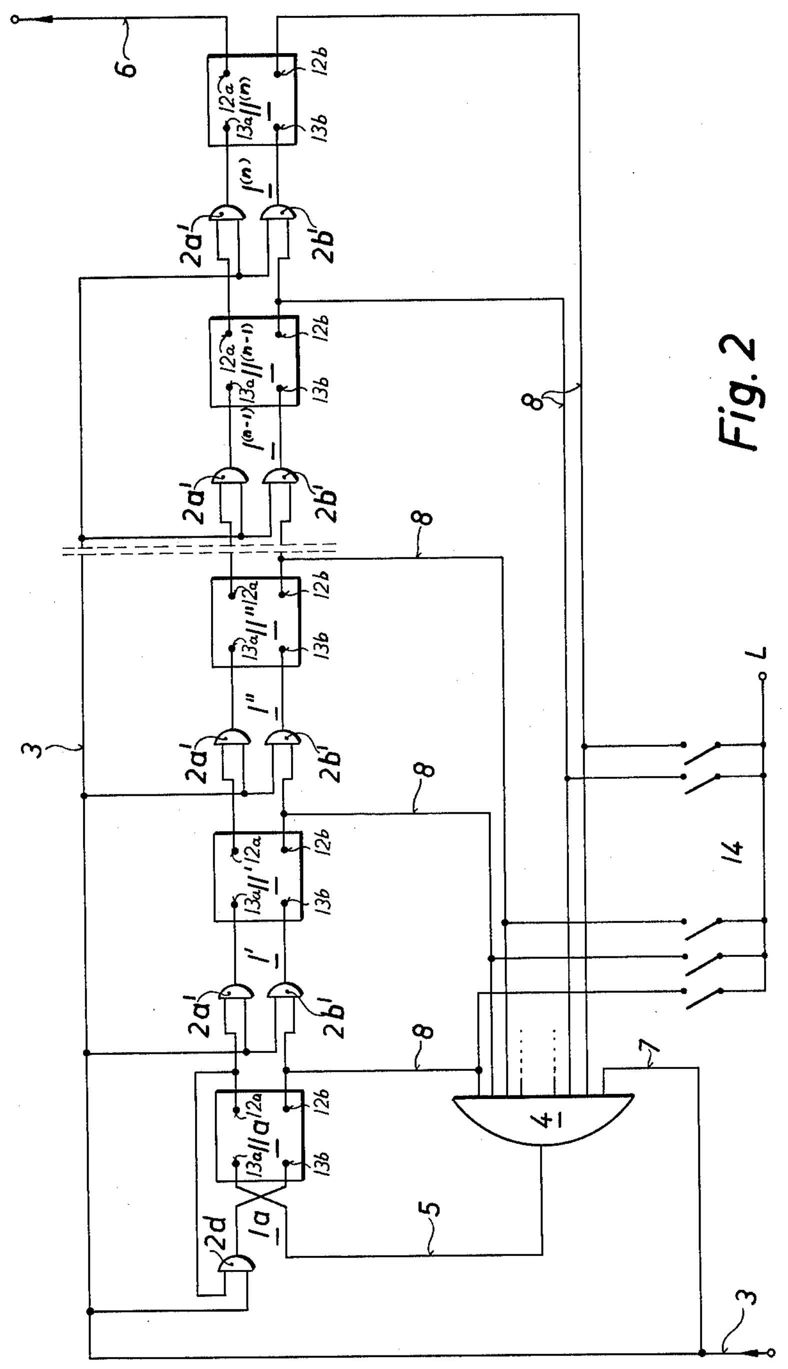
FIGURE 2 illustrates schematically a block diagram of a second preferred embodiment of the invention.

A circuit according to the present invention can also be constructed in the form shown in FIG. 2. The switching elements used herein each have two input terminals 13*a* and 13*b*, each input terminal of a switching element controlling a respective one of the two switching states. A control pulse (L) at terminal 13*a* turns the switching element on whereas a control pulse (L) at terminal 13*b* turns the switching element off. Flip-flop type switching elements having two input terminals and operating as described are well known. In particular, it is important that such switching elements be arranged so that, after the element has been turned on, further "on" pulses remain ineffective until the element has been turned off. Thus, if a switching element has been turned on by a pulse at terminal 13*a* further pulses at that terminal 13*a* remain ineffective until a turning-off pulse has appeared at terminal 13*b*, and vice versa. In this case, complete comparison between the switching state of two neighboring stages is unnecessary, because a switching stage which is in its "off" state may receive another turning off pulse without changing its state. The same holds true for the "on" state.

Therefore, one can omit the connection to the "and" gate from the output terminals of the following switching element. Consequently, the shift register wired as shown in FIG. 2 has "and" gates 2*a'* and 2*b'*, each having one gating input terminal and one shift pulse input terminal only, the gating input terminals being connected to the two output terminals of the preceding switching stage, respectively. The switching elements each have two input terminals 13*a* and 13*b*, as stated. The first terminal controlling the "on" state is conected to the output terminal of "and" gate 2*a'*, and the second terminal controlling the "off" state is connected to the output terminal of "and" gate 2*b'*. "Or" gates 2*c* of FIG. 1 are omitted because the presence of two separate input terminals serves to automatically prevent interaction between the "and" gates. All of the remaining elements and terminals are identical with those shown in FIG. 1 and are consequently referenced by identical numerals.

It should be noted specifically that the output terminal of master "and" gate 4 is directly connected to "on" input terminal 13*a* of element 11*a* whereas the output terminal of "and" gate 2*d* connects directly to off input terminal 13*b* of element 11*a*.

The device shown in FIGURE 2 operates as follows: Either one of the "and" gates 2*a'* and 2*b'* of any stage is prepared for passing the next following shift pulse occurring at its shift pulse input terminal only if the respectively connected output terminal of the preceding stage assumes its L-state. Now, two cases are to be regarded concerning the switching state of any pair of adjacent stages: (1) either the two stages are in the same switching state and the shift pulse occurring at the input of the second stage is ineffective; or (2) the two stages are in the opposite switching states and the shift pulse occurs at that input of the second stage which controls the then existing switching state of the preceding stage, thus switching the second stage into the desired state.

With the register shown in FIG. 2 provisions may be made, in analogy to those described in connection with the register shown in FIG. 1, to prevent any stage from being switched into the opposite state before its following stage has had an opportunity to switch. This can be done by having the turning "off," i.e. the reversion from (L, O) to (O, L), controlled by the trailing edge of any shift register pulse, whereas the turning "on," i.e., the shifting from (O, L) to (L, O), is carried out by the leading edge of any shift register pulse.

Since the turning "off" of a flip-flop, i.e., the switching action (L, O) to (O, L), is effectuated by an L-pulse at a 13$a$ terminal and since the corresponding turning "on," i.e., the switching action (O, L) to (L, O), is effectuated by an L-pulse at the 13$b$ terminal, the above requirements can be fulfilled by incorporating directional differentiating stages either at gates 2$a'$, 2$b'$ or at terminals 13$a$ and 13$b$, which differentiating stages are arranged to produce an L-pulse in response to respective opposite polarity differentiation spikes.

This measure also ensures that, in case a stage has been switched from the (O, L) state to the (L, O) state, the succeeding stage, if it is thereby placed in condition to be switched, cannot be switched by the same shift register pulse if, as suggested, the (O, L) to (L, O) shift of any switching element is effectuated by the leading edge of the shift register pulse. The succeeding stage, if now in condition to be switched, can only be switched from (O, L) to (L, O) by the leading edge of the next following shift register pulse.

It is apparent that, with such measure, the trailing edge of a shift register pulse cannot turn off again the flip-flop (11$^x$) which was turned on by the leading edge of the same pulse. For turning "off," the "and" gate 2$a'$ of this flip-flop must be gated open by the "off" state of the preceding stage ($1^{x-1}$). However, when a flip-flop (11$^x$) has just been turned "on" by the leading edge of a shift register pulse, its immediately preceding flip-flop ($11^{x-1}$) must already be in its "on" state and can only be turned off by the trailing edge. Thus, the flip flop (11$^x$), which has just been turned on, can be turned off only after the preceding flip-flop ($11^{x-1}$) has reverted into its "off" state, which is effectuated by the trailing edge of the shift register pulse in question. This trailing edge, of course, cannot then also turn off the flip-flop ((11$^x$) which has just been turned on.

Having described the wiring diagrams of two preferred embodiments, it shall now be considered why the invention in general, and either one of the two embodiments described in particular, does not require a resetting device for "clearing" the register after it has been turned on. Whenever the entire shift register has been disconnected from its power supply source, a reconnection thereto places the flip-flops 11$a$ to 11$^n$ into arbitrary "on" and "off" states. In general, "and" gate 4 will produce output O. When, upon such turning on of the register network, stage 1$a$ assumes its "on" state, the "and" gate 2$d$ is open to permit flip-flop 11$a$ to be switched off. Flip-flop 11$a$ now remains off until the succeeding shift register pulses have "swept" all of the arbitrary "on" states toward the last stage 11$^n$. Thus, after $n+1$ shift register pulses at the latest, the shift register is placed into its zero state, as evidenced by L-states at all of the gating terminals of "and" gate 4. The succeeding shift register pulse can then start the first operating cycle.

In normal operation, the stages 1$a$, 1', 1'', . . ., 1$^n$, have initial state patterns of (O, L), (O, L), (O, L), . . ., (O, L), respectively. Since such a condition causes gate 4 to be open, the next shift register pulse produces the pattern (L, O), (O, L), (O, L), . . ., (O, L).

The next following pulse produces the pattern (O, L), (L, O), (O, L), . . ., (O, L).

The $n+1$ pulse finally produces (O, L), (O, L), (O, L), . . ., (L, O), which state produces a main output signal on line 6 from terminal 12$a$ of flip-flop 11$^n$. The $(n+2)$ pulse empties the register completely, thereby preparing gate 4 to initiate the next cycle.

The network exhibits increased responsiveness. For simplifying the network it is possible to omit the connection between one input terminal of gate 4 and the output terminal 12$b$ of flip-flop 11$a$ of stage 1$a$. This is so because the first stage 1$a$ can be switched into its "on" state (L, O) by a shift register pulse only if it is in fact "off." When stage 1$a$ is "on," it will be turned "off" by a shift register pulse applied to "and" gate 2$d$. A new turning on of stage 1$a$ can occur only after it had reverted to its (O, L) state. It is immaterial whether the first stage is placed into its "on" state (L, O) by a proper shift register pulse or by a disturbance. In any event, this first stage has to revert to its normal state (O, L) as the result of the application of a shift register pulse before any further cycle can be started and it will do so without a connection 8 to "and" gate 4.

Figure 3:
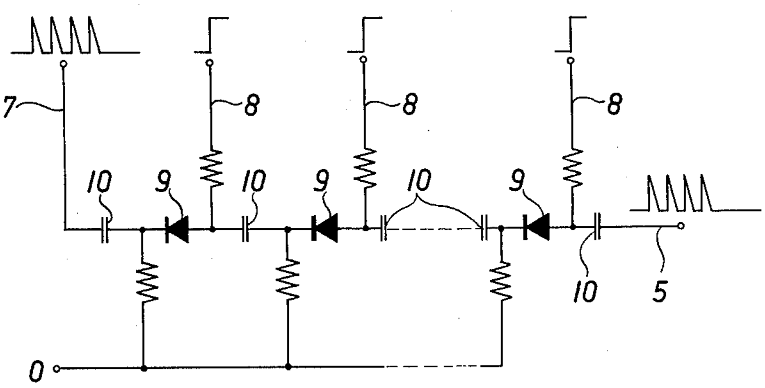
FIGURE 3 illustrates in detail the salient "and" gate used in the network as illustrated in FIG. 1.

In FIGURE 3 there is shown a particularly advantageous form for the coincidence or "and" gate 4. The gating input terminals are designated with numerals 8 and reference numeral 7 denotes the terminal line connecting the "and" gate to the shift register pulse delivery line 3 for gating through or blocking passage of shift register pulses. Each line 8 governs the potential at the anode of a diode 9, and an L-state in any line 8 is assumed to render the associated diode 9 conductive.

In order to prevent stage feedback, the diodes are conductively separated by capacitors 10. Only when all diodes 9 are conductive can the shift register pulse in line 7 pass on to output line 5 of "and" gate 4. As was stated above, this situation is present only when the shift register is completely empty, or when one or more of the switches 14 are closed.

The inventive measure for correcting errors is available also when several pulses run through the shift register simultaneously and with a particular phase separation as measured in relation to a complete shifting cycle. This is the ultimate purpose of switching device 14. Thus, one can easily provide for the concurrent actuation of several switching operations controlled by the shift register. For such case, one only has to render the diode 9 of a particular stage conductive, thus simultating the "off" state of such stage even though it is actually "on." This enables the register to start a new shifting cycle and to pass a pulse through the register to follow the preceding one which has not yet completed its passage through the register.

The invention is not limited to the embodiments described above, but all changes and modifications thereof not constituting departures from the spirit and scope of the invention are intended to be covered by the following claims.

What is claimed is:

1. Shift register including a first bistable switching element, a plurality of additional bistable switching elements and a source of shift register pulses, comprising: means for connecting said bistable elements in series and for connecting all of them at said source of pulses so that any pulse from said source switches any additional element which is in the opposite switching state from its immediately preceding element, said first element having two input terminals for initiating opposite switching responses of said first element; an "and" gate having a plurality of gating terminals respectively connected to said bistable elements, further having an output terminal connected to one of said input terminals of said first element and having a main input terminal connected to said pulse source; and a second "and" gate having input, output and gating terminals, said latter input terminal being connected to said pulse source, said latter output terminal being connected to the other input terminal of said first element, and said latter gating terminal being connected to one output terminal of said first element.

2. Shift register including a first bistable switching element, a plurality of additional bistable switching elements and a source of shift register pulses, comprising: means for connecting said bistable elements in series and for connecting all of them to said source of pulses so that any pulse from said source switches any additional element, which is in the opposite switching state from its immediately preceding element; and "and" gate having a plurality of gating terminals respectively connected to said bistable elements, further having an output terminal connected for switching said first element, and having a main input terminal connected to said pulse source; and means for independently applying a gating potential to any of the gating input terminals for said "and" gate.

3. Shift register including a first bistable switching element, a plurality of additional bistable switching elements and a source of shift register pulses, comprising: means for connecting said bistable elements in series and for connecting all of them to said source of pulses so that any pulse from said source switches any additional element which is in the opposite switching state from its immediately preceding element; an "and" gate having a plurality of gating terminals respectively connected to said bistable elements, further having an output terminal connected for switching said first element, and having a main input terminal connected to said pulse source; and selectively operable switching means for independently and selectively applying a gating potential to any of the bating input terminals of said "and" gates.

References Cited by the Examiner

UNITED STATES PATENTS

| | | | |
|---|---|---|---|
| 2,853,238 | 9/1958 | Johnson | 235—92 |
| 3,109,990 | 11/1963 | Shuba | 328—48 X |

ARTHUR GAUSS, *Primary Examiner.*

S. D. MILLER, *Assistant Examiner.*